United States Patent Office 3,337,606
Patented Aug. 22, 1967

3,337,606
COMPOUNDS HAVING KETIMINE AND NITRILE GROUPS DERIVED FROM CERTAIN ALIPHATIC POLYAMINES
Don E. Floyd, Robbinsdale, Minn., assignor to General Mills, Inc., a corporation of Delaware
No Drawing. Filed Sept. 24, 1963, Ser. No. 311,244
8 Claims. (Cl. 260—465.5)

The present invention relates to certain novel ketimines and the use thereof as curing agents for epoxy resins. More particularly, it relates to certain nitrile containing ketimines which are especially useful as latent curing agents for epoxy resins.

Epoxy resins have been known and used commercially for some time, and these resins have been described in substantial detail in numerous publications and patents. For example, epoxy resins are described in substantial detail in such recently issued United States Patents as Nos. 2,923,696, 3,026,285, 3,067,170, 3,072,606, 3,072,607, 3,073,799, 3,079,367, 3,080,341, and 3,084,139, each of which patents is included herein by reference as disclosing typical epoxy resins which are used in the practice of the instant invention.

The epoxy resins are known to produce a number of valuable products, and particularly in the coating arts, the epoxy resins are known to produce infusible, insoluble coatings or films which when properly cured exhibit desirable properties such as toughness, thermal stability, and the like. The curing agents for such epoxy resins, however, have been found to leave something to be desired. Some of such curing agents react too rapidly and thus have such a short "pot life" that the handling of the epoxy resin:curing agent system is considerably complicated. In the case of other curing agents, such agents tend to cure the compositions with objectionable results which include undesirably slow curing, low impact resistance in the cured resin and/or brittleness in the cured resin. The so-called "pot life" is important in that it represents the time that is allowed for the handling of the resin after the incorporation of the curing agent and before curing to such an extent that the resin can no longer be filmed, coated or otherwise manipulated in the manner desired prior to curing. On the other hand, only a reasonable length of "pot life" is normally desired, since it is important that the epoxy resinous composition ultimately cure to obtain good toughness and a relatively "tack-free" surface characteristic. The ultimate curing time is preferably a reasonably short curing time in the presence of an ambient atmosphere, after the desired filming or similar manipulation of the composition has been effected.

The chemistry of epoxy resins has been studied extensively. The epoxy resins are understood to contain the characteristic functional epoxy group, i.e.

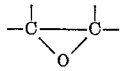

which characteristic functional group is understood to undergo the following cross-linking reactions when a primary amine is used as a curing agent:

(1) 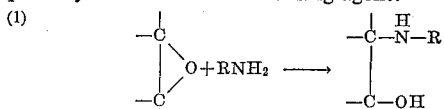

(2) 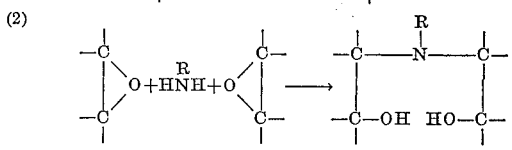

(3) 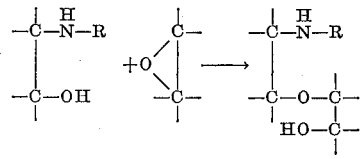

Under normal conditions, the two amine-epoxy reactions, i.e. (1) and (2), predominate and proceed at approximately equal rates. The use of simple primary amines, as cross-linking agents, ordinarily results in far too short a "pot life," among other undesirable results.

The prior workers in the art have suggested other cross-linking agents, as indicated in the previously mentioned patents, and specifically in U.S. Patent No. 3,026,285 mention is made of the use of a complex of a primary amine and an aldehyde. The reaction of a primary amine and a carbonyl compound, such as an aldehyde or ketone, is understood to proceed in accordance with the following equation:

(4) 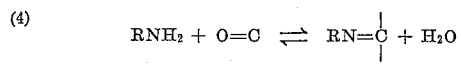

The foregoing reaction is, of course, reversible and the resulting complex will thus react in the presence of moisture to produce the primary amine again. The initial reaction to form the complex is carried out under conditions effecting the removal of water. Specific mention of such materials is also made in the aforesaid U.S. Patent No. 3,072,606, although the mention is made for use in connection with certain Friedel-Crafts catalysts.

Certain ketimines are known as curing agents for epoxy resins. Representative of such compounds are the following:

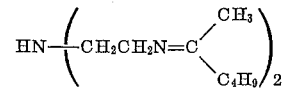

and

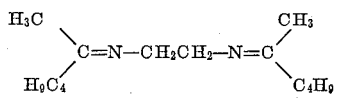

These ketimines possess several advantages over the ordinary amine curing agents for epoxy resins. "Pot life" or storage life is relatively long, they do not readily absorb carbon dioxide from the atmosphere to give solid residues and moisture aids the curing rather than leading to blushing and related effects. The azomethine linkage of such ketimines is apparently suitable for use in a latent curing agent, in that it will release the primary amine in a film or otherwise formed composition of an epoxy resin, upon adequate exposure to water or the moisture of an ambient atmosphere. The instant invention, however, relates to the discovery of certain ketimines which have an unusual combination of properties, as latent epoxy curing agents.

The ketimines of the present invention have the advantage of being compatible with epoxy resin compositions to form compositions having the desired prolonged pot life, but to form compositions which have a relatively short tack-free time once applied in a film or other desired form for curing, upon exposure to ambient moist atmosphere. Addition of water to the formulation will, of course, accelerate the cure, but this procedure limits the uses of the composition by decreasing the pot life. The instant ketimines afford other advantages, in addition to compatibility and latent curing effects. They are less viscous and thus their use with liquid epoxies is enhanced since solvents need not be added to the hardenable compositions. This makes application of films with a brush or roller feasible without the possibility of entraining solvent in the films, particularly those that are more than 5 mils in thickness. The ketimines of the present invention also provide coatings which have an inherent flexibility, are free from exudation and greasiness and, when prepared from liquid epoxy resin, are essentially free from tack after curing at high relative humidities or in thick films. These various superior properties are believed to result from the desirable aspects of compatibility that are obtained using the specific ketimines described herein.

It is, therefore, an important object of the instant invention to provide an improved latent epoxy curing agent.

Another object of the invention is to provide an improved hardenable epoxy resin composition.

A further object of the invention is to provide an improved infusible, insoluble epoxy resin product.

Other and further objects, features and advantages of the present invention will become apparent to those skilled in the art from the following detailed disclosure thereof, including the examples hereof.

In general, the instant invention consists in a new substance or material that is a ketimine formed from an adduct of (a) 2.5 to 4 mols of an aliphatic amine having the formula:

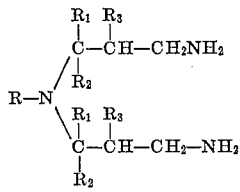

where R is an aliphatic $C_8-C_{22}$ fatty hydrocarbon chain and $R_1$, $R_2$ and $R_3$ are each hydrogen or short chain alkyl groups (1 to 4 carbon atoms), with (b) 2.5 to 4 mols of an $\alpha,\beta$-unsaturated nitrile. The present invention further consists in hardenable compositions prepared from such ketimines and epoxy resins and to infusible, insoluble resinous products prepared from such hardenable compositions.

Although it is not desired to limit the invention to any particular theory, it is believed that in the preparation of the ketimine of the present invention, using certain preferred starting materials, as an example, it is possible to obtain a ketimine base "composition" which contains a mixture of a number of different complexes or chemical compounds, merely by selection of the approximate molar ratios that are employed in the preparation of the instant ketimines. Typical of the compounds of the present invention is the following which has the theoretical structural formula:

(I)      lauryl—N$\diagup\diagdown$ $\begin{array}{c}CH_2CH_2CH_2NHCH_2CH_2C{\equiv}N\\ CH_2CH_2CH_2N{=}C{-}CH_3\\ |\\ C_2H_5\end{array}$ The reaction route for the preparation of the above compound (I) is understood to involve the following theoretical reaction sequence (5), which involves first forming an adduct (IV) of bis-(aminopropyl)laurylamine (II) and an equimolar proportion of acrylonitrile (III) and then reacting the remaining primary amine groups of such adduct (IV) with methyl ethyl ketone (V) to obtain the ketimine (I), as follows:

(5) *Reaction Route for Typical Preferred Ketimine of Invention*

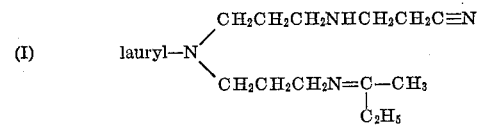

(III)      $CH_2{=}CHC{\equiv}N$

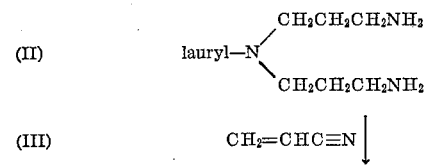

(IV)      lauryl—N$\diagup\diagdown$ $\begin{array}{c}CH_2CH_2CH_2NHCH_2CH_2C{\equiv}N\\ CH_2CH_2CH_2NH_2\end{array}$ (V)      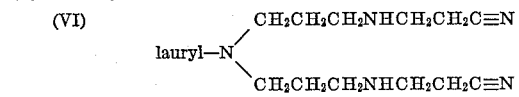 with removal of $H_2O$ (I)      lauryl—N$\diagup\diagdown$ $\begin{array}{c}CH_2CH_2CH_2NHCH_2CH_2C{\equiv}N\\ CH_2CH_2CH_2N{=}C{-}CH_3\\ |\\ C_2H_5\end{array}$ It is also understood that mixtures of compounds may result by varying the mol ratios of the reactants. Thus when an excess of the nitrile (III) is employed as compared to the amine (II), the latent curing agent of the present invention may contain a proportion of the following compound:

(VI)      lauryl—N$\diagup\diagdown$ $\begin{array}{c}CH_2CH_2CH_2NHCH_2CH_2C{\equiv}N\\ CH_2CH_2CH_2NHCH_2CH_2C{\equiv}N\end{array}$ And when an excess of amine (II) as compared to the nitrile (III) is employed, the latent curing agent may contain a proportion of the following compound:

(VII)      lauryl—N$\diagup\diagdown$ $\begin{array}{c}CH_2CH_2CH_2N{=}C{-}CH_3\\ |\\ C_2H_5\\ CH_2CH_2CH_2N{=}C{-}CH_3\\ |\\ C_2H_5\end{array}$ Such mixtures of compounds are also included as the latent curing agents of the present invention. It is, however, preferred to employ equimolar proportions of the amines and nitrile so that the major product is the ketimine (I).

One aspect of the ketimines of the present invention is that they have a long aliphatic chain which is believed to contribute to the compatibility and other desirable features of the invention. One of the starting materials, sometimes referred to herein as (a), thus used in the practice of the invention, is an aliphatic polyamine having the formula:

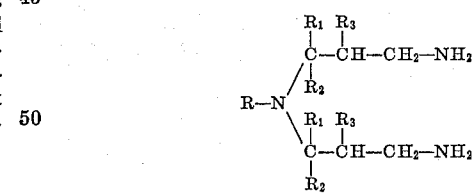

wherein $R_1$, $R_2$ and $R_3$ are each hydrogen or short chain alkyl groups (1 to 4 carbon atoms) and R is an aliphatic $C_8-C_{22}$ hydrocarbon group (i.e. containing from 8 to 22 carbon atoms) such as octyl, nonyl, decyl, undecyl, dodecyl (lauryl), dodecenyl, octadecyl, oleyl, and the like. Preferably, the R group will be derived from the naturally occurring fatty acids such as oleic, lauric, linoleic, and the like, or mixtures thereof found in the fatty oils such as tall oil, coconut oil, and the like. Where R is derived from a mixture of acids, such as coconut oil acids, R is defined in the usual manner by the source of the acids, such as coco, etc. R is preferably an aliphatic group containing 8-16 carbon atoms. Aliphatic polyamines wherein R is a 12 carbon atom group are even more preferred $R_1$, $R_2$ and $R_3$ are preferably hydrogen or methyl.

The above described aliphatic polyamines may be prepared in the conventional manner by a two-step process consisting of the preparation of the diadduct of acrylonitrile (or substituted acrylonitrile such as methacrylonitrile or crotonic nitrile) with a primary aliphatic amine in which the aliphatic group has from 8 to 22 carbon atoms followed by subsequent hydrogenation of the dinitrile product to the amine product.

The principal means of preparing the diadducts of acrylonitrile and the primary aliphatic amines consists in reacting an excess of the acrylonitrile (two to ten times the theoretical amount) with the aliphatic amine in the presence of an acid catalyst within the temperature range of 60–100° C. In general, the relatively strong acids, such as acetic acid and phosphoric acid, are used in the dicyanoethylation process. In addition to the acidic catalysts, other non-acid catalysts may also be employed. The time of reaction depends largely on the particular catalysts used and the proportions thereof. In general, the time of reaction will be from seven to forty hours.

The polyamines are then obtained by the hydrogenation of the dinitriles. Any conventional hydrogenation technique may be employed which will reduce the nitrile groups. In general, the reduction is carried out in the presence of a catalyst, such as palladium or nickel, and in the presence of ammonia under super-atmospheric conditions and at temperatures less than 100° C., in the range of 70–100° C., under pressure of hydrogen on the order of 700 to 1500 pounds per square inch gauge. In general, about two mols of ammonia per mol of tertiary amine is employed. When using wet Raney nickel as a catalyst, the catalyst is used generally in an amount of about 10% by weight based on the amount of dinitrile.

The preparation of the acrylonitrile diadduct can best be illustrated by means of the following procedure:

Ten equivalents of commercial distilled dodecyl amine (1970 grams), methanol (197 grams), 27 equivalents of acrylonitrile (1448 grams) and glacial acetic acid (39.4 grams) were stirred and heated under reflux for two and one-half hours. The stirrer was then stopped and the reaction allowed to stand at 47° C. for a total of 40 hours. The excess acrylonitrile, methanol and possibly some acetic acid were removed by heating the reaction product to 105° C. under a vacuum of 25 mm. The yield was 2990 grams (theory=3030 grams). As the diadduct is the tertiary amine present in the reaction mixture, the percent of diadduct present was determined by direct titration of the tertiary nitrogen atom. The tertiary amine content was 86%.

In a similar manner, the acrylonitrile, methacrylonitrile, crotonic nitrile and the like diadducts may be formed from tallow amine, coco amine, oleyl amine and similar fatty amines in which the fatty radical contains 8 to 22 carbon atoms. The diadduct can then be hydrogenated as indicated hereinbefore.

The described aliphatic polyamine (a) is then reacted with an $\alpha,\beta$-unsaturated nitrile (b). As indicated above the mol ratio of (a) to (b) can vary from 2.5–4.0 to 4.0 to 2.5. The preferred $\alpha,\beta$-unsaturated nitriles have the following theoretical structural formula:

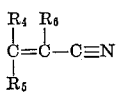

where $R_4$, $R_5$ and $R_6$ are each hydrogen or short chain alkyl groups (1 to 4 carbon atoms). The radicals $R_4$, $R_5$ and $R_6$ are preferably hydrogen or the methyl group. Representative and preferred compounds are acrylonitrile, methacrylonitrile and crotonic nitrile.

The reaction between the aliphatic polyamine (a) and the nitrile (b) is carried out simply by admixing thereof in a reaction flask. Reaction temperatures can vary considerably but will generally be within the range of ambient room temperature to about 100° C. The higher temperatures require the use of reflux conditions due to the volatility of the nitrile. Reaction times of about 1 to 20 hours are generally employed. Catalysts can be employed if desired. When equimolar quantities of the amine (a) and the nitrile (b) are employed, an adduct having the following theoretical structural formula is obtained:

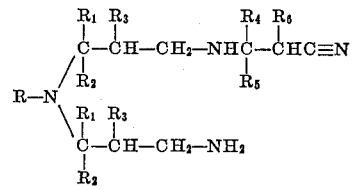

wherein $R$–$R_6$ are defined as above. When an excess of the nitrile is employed, a portion of the reaction product may comprise the following compound having the theoretical structural formula:

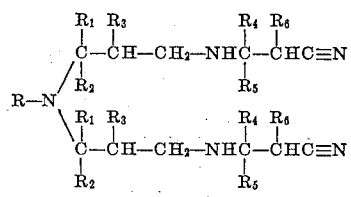

Still another starting material, sometimes referred to herein as (c), used in the practice of the invention, is a carbonyl compound which is, first of all, an aldehyde or ketone which reacts with a primary amine group with elimination of water to form a ketimine (i.e. an azomethine linkage). Such a carbonyl compound (c) may have the following theoretical structural formula:

wherein $R_7$ and $R_8$ are each substantially inert to the ketimine formation reaction and are preferably hydrogen or short chain alkyl group (1 to 4 carbon atoms). Preferred compounds are low molecular weight ($C_2$–$C_6$) aldehydes or ketones that are volatile so that an unreacted excess thereof may be easily removed by conventional distillation practices when the reaction is completed. Also it is often preferred to use a carbonyl compound (c) which boils near the boiling point of water and forms a low boiling azeotrope or codistillate with the water.

Preferred examples of the carbonyl compound (c) include acetone, methyl ethyl ketone, diethyl ketone, methyl propyl ketone, methyl isopropyl ketone, methyl n-butyl ketone, methyl tert.-butyl ketone, ethyl isopropyl ketone, acetaldehyde, propionaldehyde, butyraldehyde, isobutyraldehyde and the like (i.e. including hexanone and hexanol). Especially preferred carbonyl compounds are acetone and methyl ethyl ketone.

The ketimine is formed from the adduct obtained by reacting the aliphatic polyamine (a) and the nitrile (b) by simply adding the carbonyl compound (c) under conditions normally employed to produce azomethine compounds. Thus the product of (a) and (b) and the carbonyl compound are admixed and then any unreacted carbonyl, water and other volatiles are removed by distillation. It is preferred to employ a substantial excess of the carbonyl compound in order to insure that the ketimine is produced and the reaction is completed. Ambient room temperatures can be employed for the reaction with the excess carbonyl compound and water being distilled off at somewhat higher temperatures. The reaction is normally complete within a few minutes to an hour or more. When equimolar proportions of the amine (a) and the nitrile (b) are employed, there results a preferred ketimine having the following theoretical structural formula:

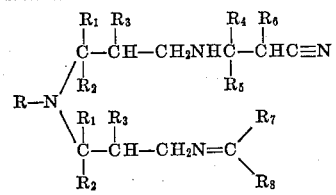

wherein R–R$_8$ are as defined hereinabove. When an excess of the amine (a) is employed as compared to the nitrile (b), a portion of the latent curing agent may comprise the following compound having the theoretical structural formula:

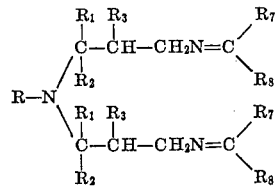

The preparation of the ketimines of the present invention is illustrated by the following examples.

*Example I*

To 299 grams (one mole) of bis(aminopropyl)laurylamine in a two liter flask there was added 53 grams (one mole) of acrylonitrile in small portions during a period of one hour while the reaction mixture was held at a temperature of about 50° C. by means of a water bath. The mixture was allowed to stand overnight at room temperature and then 360 grams (5 moles) of methyl ethyl ketone was added gradually. The flask was set for distillation and unreacted ketone, water and other volatiles were removed by distillation to a pot temperature of 90° C., using water-pump vacuum for the last stages. There was obtained 386 grams of a pale yellow-colored, liquid product which consisted mainly of the ketimine having the following formula:

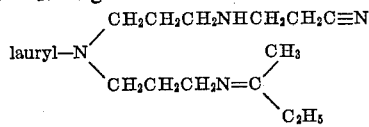

*Example II*

The procedure of Example I was repeated using the following amounts of reactants: 150 grams (0.5 mole)

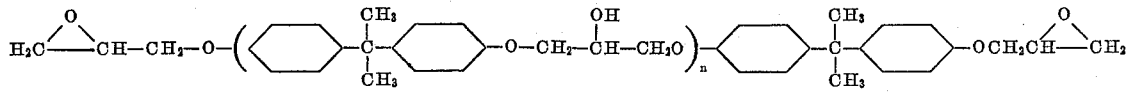

bis(aminopropyl)laurylamine, 23 grams (0.45 mole) acrylonitrile and 180 grams (2.5 moles) methyl ethyl ketone. There was obtained a pale yellow colored liquid which consisted mainly of the ketimine defined in Example I with approximately 10% by weight of the following compound:

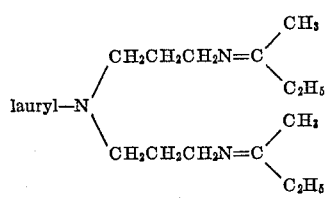

*Example III*

Example II was repeated using the same amounts of the amine and carbonyl compound but using only 18.5 grams (0.35 mole) acrylonitrile. There was obtained a pale yellow-colored liquid as in Example II which contained additional amounts of the compound defined thereis due to a further reduction in the amount of the nitrile reactant (b).

*Example IV*

To 150 grams (0.5 mole) of bis(aminopropyl)laurylamine in a one liter flask was added 18.5 grams (0.35 mole) of acrylonitrile slowly and with cooling, as needed, so that the temperature of the reaction mixture did not rise above 50° C. The mixture was allowed to stand overnight and then 250 grams (2.5 moles) of methyl isobutyl ketone was added. The flask was set for distillation and a mixture of water and the ketone was removed by distillation through a small Vigreux column until 100 ml. of distillate had been obtained. The pot temperature rose to about 140° C. during this time. The remaining volatiles were stripped off using water pump vacuum at a pot temperature of 120–130° C. There was obtained 204 grams of a pale yellow-colored liquid which consisted of approximately a 70:30 mixture of the following compounds:

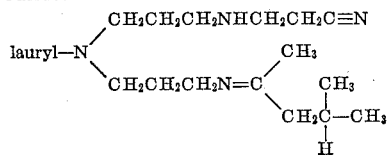

and

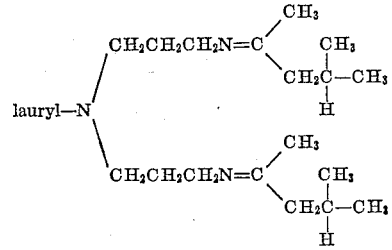

As indicated above the ketimine compositions of the present invention are particularly useful as latent curing agents for epoxy resins. Any epoxy resin can be used in the present invention. Suitable resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl)propane (Bisphenol A), the resin having the following theoretical structural formula:

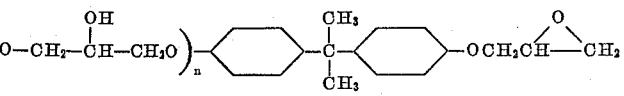

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl)sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimericacids, the glycidyl esters thereof may be represented by the following theoretical, idealized formula:

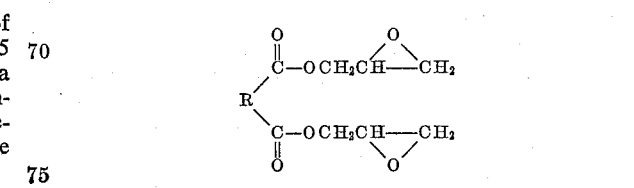

where R is the divalent hydrocarbon radical of dimerized unsaturated fatty acids.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticica, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 6 to 22 carbon atoms. Illustrative thereof are oleic, linolenic, palmitoleic, and the like. Glycidyl esters of other polybasic acids, such as phthalic and sebacic acids, may be employed.

Other types of epoxy resins which may be used with the ketimine compositions of the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxyphenyl) alkanes, such as 1,1,2,2-tetrakis (hydroxyphenyl) ethane, 1,1,4,4 - tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

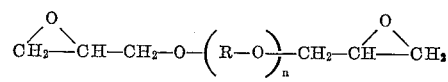

where R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following theoretical, idealized formula:

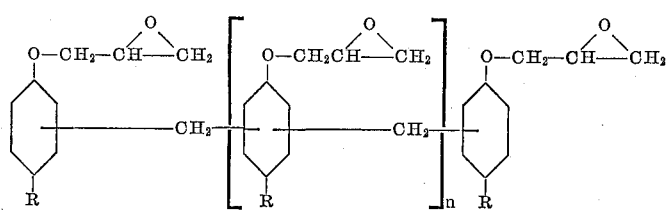

where R is selected from the group consisting of hydrogen and alkyl groups having up to 18 carbon atoms, and $n$ is an integer of from 1 to 10. Generally, $n$ will be an integer in excess of 1 to about 5.

In general, these resins are obtained by epoxidation of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used with the ketimines of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

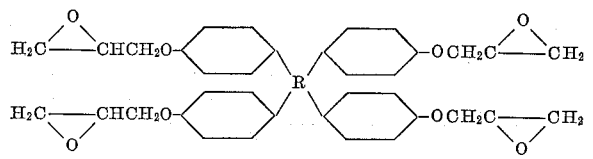

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups, or at least as having more than one epoxide group per molecule.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

The ketimines of the present invention are used in an amount sufficient to cure the epoxy resin to an insoluble and infusible polymer. Ideally the amount of the ketimine curing agent would be sufficient to provide about one primary amino group for two epoxy groups in the resin, in accordance with the general theory that the cross-linking reaction proceeds predominantly through the primary amine group. In actual practice, however, such factors as stearic hindrance, self cross-linking of the epoxy and the like preclude reaction of every epoxy group and every primary amino group in many cases. The weight ratios preferred for use in the practice of the instant invention on the basis of (1) epoxy resin to (2) ketimine may range from about 8:2 to about 1:1. It will be appreciated that the relative proportions of (1):(2) relate to the hardenable components of the composition and suitable conventional additives such as pigments, fillers, flow control agents, accelerators, solvents and the like may be incorporated in the compositions. In addition, curing conditions can be varied to suit a particular need, e.g. by increasing or decreasing the temperature and/or relative humidity. Water may be added to give quicker activation.

The following examples illustrate the use of the ketimines of the present invention as curing agents for epoxy resins. All parts are by weight unless otherwise indicated.

*Examples V–VIII*

Forty parts by weight of each of the ketimine compositions of Examples I–IV were admixed with 60 parts of an epoxy resin which was a liquid condensation product of Bisphenol A and epichlorohydrin having an epoxy equivalent weight of about 190. One part of phenol (accelerator) and 1 part of DC–840 (flow control agent—a silicone resin available from Dow Chemical Co.) was added to each of the said hardenable compositions. The respective compositions were then tested for pot life (viscosity increase in an atmosphere substantially free from moisture) and for hardness and extensibility of films prepared therefrom. The results are set forth in the following Tables I–IV:

TABLE I

| Composition | Viscosity (Gardner Holdt) | | |
|---|---|---|---|
| | Initial Values | After 8 Hours | After 24 Hours |
| Example V | J | N | X |
| Example VI | J | N | W |
| Example VII | H | L | U |
| Example VIII | H | K | T |

TABLE II.—FILM HARDNESS (PENCIL)

[Five mil films—Cured at 75° F. and 50% relative humidity after a two hour induction period]

| Composition | 1 Day | 3 Days | 7 Days |
|---|---|---|---|
| Example V | 6B | 2B | HB. |
| Example VI | 6B | 2B | HB. |
| Example VII | Sl. tack | Sl. tack | Not tested. |
| Example VIII | ---do--- | ---do--- | Do. |

TABLE III.—FILM HARDNESS (PENCIL)

[Ten mil films—Cured at 75° F. and 50% relative humidity after a two hour induction period]

| Composition | 1 Day | 3 Days | 7 Days |
|---|---|---|---|
| Example V | 7B | 3B | B. |
| Example VI | Not tested | Not tested | Not tested. |
| Example VII | ---do--- | ---do--- | Do. |
| Example VIII | ---do--- | ---do--- | Do. |

TABLE IV.—IMPACT-EXTENSIBILITY (G.E. TESTER)

[Five mil films—Cured at 75° F. and 50% relative humidity after a two hour induction period]

| Composition | 1 Day | 3 Days | 7 Days |
|---|---|---|---|
| Example V | 1% | 1% | 5%. |
| Example VI | 1% | 1% | 2%. |
| Example VII | Not tested | Not tested | Not tested. |
| Example VIII | ---do--- | ---do--- | Do. |

The data of the above examples show that the ketimines of the present invention yield hardenable compositions having a desirable long pot life and yet which will cure in relatively short periods of time at ambient temperatures and in the presence of moisture to yield films which are substantially tack free, tough and flexible. The hardenable compositions are easy to prepare due to the liquid nature of the ketimine compositions. The hardened coatings are not greasy indicating a high degree of compatibilty between the ketimines and the liquid epoxies.

Known ketimines as described hereinabove give hardenable compositions which have a shorter pot life and hardened coatings which are more brittle and have a tendency to be greasy indicating some incompatibility of the reactants. Additionally, the hardenable compositions are more difficult to prepare and use due to the very viscous nature of the said ketimines. Products of the present invention, in combination with liquid epoxy resins, can be applied readily as coatings by roller or brush since they are less viscous than known ketimines.

*Example IX*

Water can also be added to the hardenable compositions just prior to the preparation of films therefrom. Thus a hardenable composition comprising 20 grams of the ketimine of Example I, 30 grams of the same epoxy resin as used in Example V, 0.5 gram phenol and 0.5 gram DC–840 (silicone resin) was admixed with 0.9 gram water and then the viscosity and film hardness were measured as in Tables I and II above. Initial viscosity was G which increased to S and X after 7 and 24 hours, respectively. Hardness after 1, 4 and 7 days was 7B, HB and HB, respectively.

*Examples X–XI*

Example V was repeated except that the ratio of ketimine to epoxy resin was varied. In Example X the ratio was 35:65 and in Example XI the ratio was 45:55 in parts by weight. Viscosities and pot lives of such compositions were substantially the same as the hardenable composition of Example V and 5 mil films had essentially the same fine properties after 7 days, although the film from Example XI was more flexible but just slightly less hard.

*Examples XII–XIV*

Pigmented bases were prepared by grinding of the following ingredients using a Waring Blender:

*Example XII (White Base)*

| | Grams |
|---|---|
| Epoxy resin | 600 |
| Rutile TiO$_2$ | 450 |
| Bentone 27 | 20 |
| Methanol | 10 |
| Phenol | 10 |
| DC–840 | 10 |

*Example XIII (Green Base)*

| | Grams |
|---|---|
| Epoxy resin | 600 |
| Chromium oxide pigment | 450 |
| Bentone 27 | 20 |
| Methanol | 10 |
| Phenol | 10 |
| DC–840 | 10 |

*Example XIV (Primer Base)*

| | Grams |
|---|---|
| Epoxy resin | 600 |
| Zinc yellow pigment | 560 |
| Bentone 27 | 13 |
| Methanol | 6 |
| Phenol | 7 |
| DC–840 | 10 |

The epoxy resin was the same as set forth in Example V and Bentone 27 is a reaction product of an organic base and a mineral clay available from National Lead Company. Twenty parts of the ketimine of Example I was admixed with 55 parts of the white base, 60 parts of the green base and 60 parts of the primer base, respectively. Five mil films were cast of each of the pigmented, hardenable compositions as in Example V. These cured to provide attractive, pigmented finishes which had similar fine properties to the films of Examples V–XI.

The hardenable compositions of the present invention are useful for preparing insoluble, infusible polymers for a variety of purposes, including those where conventional epoxy-curing agent systems are employed. They find particular use as coating materials for a wide variety of substrates, representative of which are the followings: masonry, wood, and metals such as iron, steel, aluminum and other.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. Compounds having the formula:

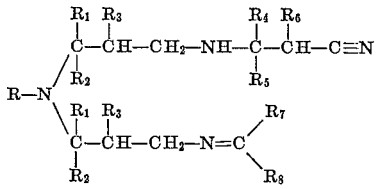

where R is an aliphatic hydrocarbon radical containing 8 to 22 carbon atoms and $R_1$–$R_8$ are radicals selected from the group consisting of hydrogen and alkyl groups containing 1 to 4 carbon atoms with the proviso that at least one of the $R_7$ and $R_8$ radicals must be an alkyl group.

2. The compounds of claim 1 where $R_4$, $R_5$ and $R_6$ are hydrogen.

3. The compounds of claim 1 where $R_7$ is methyl and $R_8$ is ethyl.

4. The compounds of claim 1 where R is an aliphatic hydrocarbon radical containing 8 to 16 carbons atoms.

5. A composition consisting of a mixture of compounds having the formulae:

(I)
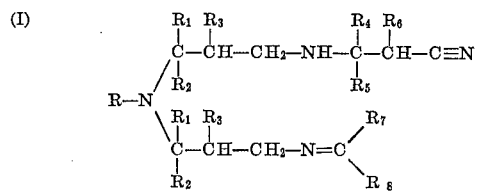

and (II)
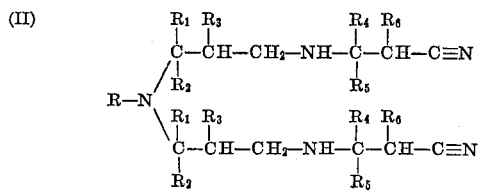

where R is an aliphatic hydrocarbon radical containing 8 to 22 carbon atoms and $R_1$–$R_8$ are radicals selected from the group consisting of hydrogen and alkyl groups containing 1 to 4 carbon atoms with the proviso that at least one of the $R_7$ and $R_8$ radicals must be an alkyl group, said compounds (I) and (II) being present in the mixture in a ratio of 1 mole of (I) to not more than 1.5 moles of (II).

6. A composition consisting of a mixture of compounds having the formulae:

(I)
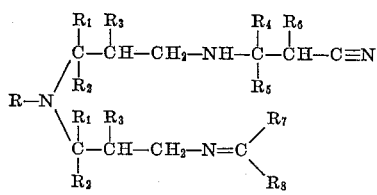

and (III)
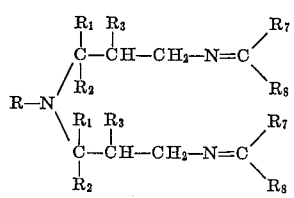

where R is an aliphatic hydrocarbon radical containing 8 to 22 carbon atoms and $R_1$–$R_8$ are radicals selected from the group consisting of hydrogen and alkyl groups containing 1 to 4 carbon atoms with the proviso that at least one of the $R_7$ and $R_8$ radicals must be an alkyl group, said compounds (I) and (III) being present in the ratio of 2.5 moles of (I) to not more than 1.5 moles of (III).

7. A compound having the formula:

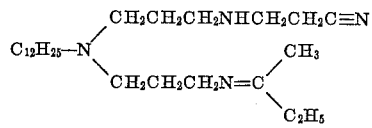

8. A compound having the formula:

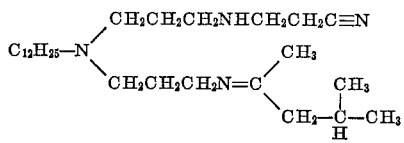

No references cited.

CHARLES B. PARKER, *Primary Examiner.*
JOSEPH P. BRUST, *Examiner.*